United States Patent [19]
Snyder et al.

[11] Patent Number: 5,490,200
[45] Date of Patent: Feb. 6, 1996

[54] SYSTEM AND METHOD FOR REMOTELY TRIPPING A SWITCH

[75] Inventors: Bernard M. Snyder, San Diego; Morris J. Goldberg, Los Angeles, both of Calif.

[73] Assignee: J.F.A. Tech., Inc., San Diego, Calif.

[21] Appl. No.: 386,600

[22] Filed: Feb. 10, 1995

Related U.S. Application Data

[63] Continuation of Ser. No. 154,818, Nov. 19, 1993, abandoned.

[51] Int. Cl.⁶ .................................................. H04Q 7/06
[52] U.S. Cl. ............................................. 379/57; 340/993
[58] Field of Search ................................. 379/58, 59, 63, 379/57, 44 60; 340/426, 539, 993; 455/33.1, 54.1, 12.1; 290/38 C

[56] References Cited

U.S. PATENT DOCUMENTS

| | | | |
|---|---|---|---|
| 3,112,004 | 11/1963 | Neaville . | |
| 3,824,469 | 7/1974 | Ristenbatt . | |
| 4,619,231 | 10/1986 | Stolar et al. . | |
| 4,660,528 | 4/1987 | Buck . | |
| 4,884,055 | 11/1989 | Memmola . | |
| 4,904,983 | 2/1990 | Mitchell . | |
| 4,962,522 | 10/1990 | Marian | 379/57 |
| 4,990,890 | 2/1991 | Newby . | |
| 5,040,204 | 8/1991 | Sasaki et al. | 379/58 |
| 5,081,667 | 1/1992 | Drori et al. | 379/59 |
| 5,113,427 | 5/1992 | Ryoichi et al. . | |
| 5,124,565 | 6/1992 | Yoshida et al. . | |
| 5,140,308 | 8/1992 | Tanaka . | |
| 5,303,286 | 4/1994 | Wiedeman | 455/12.1 |

OTHER PUBLICATIONS

"Automotive: Security Systems—Stop Thief!," Popular Science, Jun. 1993, p. 34.
"New: See How Electronics Will Change our Lives," The San Diego Union Tribune, Jan. 10, 1994, p. E-3 (the "Posse" by Audiovox).

*Primary Examiner*—Curtis Kuntz
*Assistant Examiner*—Michael B. Chernoff
*Attorney, Agent, or Firm*—Fish & Richardson

[57] ABSTRACT

A system and method for remotely signaling a vehicle. The system comprises a pager unit for receiving a wireless communication and for generating a first signal in response to receiving the wireless communication, the pager unit being located in the vehicle. The wireless communication is transmitted by a transmitter to a central switching unit, and from the central switching unit, the wireless communication is relayed through a satellite to the pager unit. The system also comprises a tripping circuit, responsive to the first signal, for generating a second signal, and a switch, responsive to the second signal, for causing an action in the vehicle. The method comprises transmitting a signal by the transmitter to the central switching unit. The signal includes a remote location pager number corresponding to the pager unit and a predetermined security code. The method further comprises transmitting the signal by the central switching unit, satellite relaying the signal from the central switching unit to the pager unit, receiving the signal by the pager unit, and tripping a switch in response to receiving the signal, thereby causing an action in the vehicle.

24 Claims, 2 Drawing Sheets

SYSTEM AND METHOD FOR REMOTELY TRIPPING A SWITCH

This is a continuation of application Ser. No. 08/154,818, filed Nov. 19, 1993, now abandoned.

BACKGROUND OF THE INVENTION

1. Field of the Invention

The present invention relates to a system and method for remotely signaling a vehicle. More particularly, the invention relates to a system and method for sending a signal from a remote location over a wireless network to a another remote location, such as a vehicle, in order to trip a switch located in the vehicle.

2. Description of Related Art

Car-jackings and vehicle theft have become a serious problem, especially in the past few years. Many vehicle theft prevention systems for automobiles, trucks, and boats are known and presently used. These systems fall into three general classes: physical locking devices, alarm systems, and systems for shutting-down the vehicle. Nevertheless, vehicle thieves and car-jackets have conducted a running, and mainly winning, battle with such theft prevention systems.

Physical locking devices constitute the first class of vehicle theft prevention systems. An example of such a device is The Club®, which inclues a metallic shaft and a locking mechanism located on the shaft. The Club® attaches to the steering wheel of a car or truck and, while attached, inhibits movement of the steering wheel. Thieves, however, can easily defeat The Club® and other physical locking devices, for example, by simply spraying freon into the locking mechanism and striking the lock with sufficient force to break it. The physical locking device can then be easily removed from the steering wheel.

Falling within the second class, myriad alarm systems exist for preventing vehicle theft. Such systems operate to deter a thief before the thief undertakes to steal a vehicle. Alarm systems employ various deterrence methods, including sound and visual alarms. Nevertheless, thieves can easily disable alarm systems, thereby rendering them ineffective, even useless in some cases. Even if not disabled, a thief can allow the alarm to activate and simply drive away in the vehicle while the alarm is sounding. Thus, alarm systems cannot counteract a determined thief.

As for the third type, various systems exist for shutting-down a vehicle. For example, some systems work in conjunction with law-enforcement agencies, by which the agency can remotely shut-down the vehicle. Such systems, therefore, require intervention by the agency and thus cannot be implemented by the vehicle owner without some assistance. In a similar system, the vehicle owner must call a central service, which can then transmit a signal over a satellite network to disable the vehicle's engine. This system, however, requires the central service and thus can be costly and can incur delays between the owner's initial call and the transmission of a cut-off signal to the vehicle by the service. In addition, the law-enforcement and central service systems require the vehicle owner to invest in expensive electronic components for installation in the vehicle and only work in a covered "local" area.

Other vehicle shut-down systems use infra-red carrier waves produced by a transmitter that must be directed towards a receiver in the stolen vehicle to terminate the vehicle's operation. Such systems, however, require a short distance and a direct line of sight between the transmitter and receiver. Similar systems employ radio transmission devices to shut-down the vehicle. These systems also suffer from a limited range, and have the disadvantage of stopping all vehicles equipped with a similar radio receiver. Moreover, the infra-red and radio systems are expensive and demand that the vehicle owner invest in costly customized devices for the vehicle.

In light of the foregoing, a need exists for a system and method for remotely tripping a switch in a vehicle or other remote location using a standard telephone, a wireless network, and an inexpensive receiver located within the vehicle, the system and method being activated by a vehicle owner without assistance or intervention from an outside party.

SUMMARY OF THE INVENTION

Accordingly, the present invention is directed to a system and method for remotely signaling a vehicle located within a vehicle or some other remote location that substantially obviates one or more of the problems due to limitations and disadvantages of the related art.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims, as well as the appended drawings.

To achieve these and other advantages and in accordance with the purpose of the invention, as embodied and broadly described herein, the invention is a system by which an owner or custodian of a vehicle can remotely trip a switch located in the vehicle. The system includes a receiver located in the vehicle for receiving an unassisted telephone call made by the vehicle owner or custodian. The system also includes tripping circuit for tripping the switch, the tripping circuit being responsive to the receiver.

In another aspect, the present invention is a method for remotely signaling a vehicle by the a vehicle owner or custodian. The method includes sending a signal through a wireless communication network to the vehicle. The signal includes a predetermined telephone number corresponding to a receiver located within the vehicle and a predetermined security code, both of which are dialed on a telephone by the vehicle owner or custodian. The signal is received by the receiver, and in response to such reception, the switch is tripped.

It is to be understood that both the foregoing general description and the following detailed description are exemplary and explanatory only and are not restrictive of the invention, as claimed.

BRIEF DESCRIPTION OF THE DRAWINGS

Understanding of the present invention will be facilitated by consideration of the following detailed description of a preferred embodiment of the present invention taken together with the accompanying drawings, in which like numerals refer to like parts and in which.

DETAILED DESCRIPTION OF THE INVENTION

Figure 1:
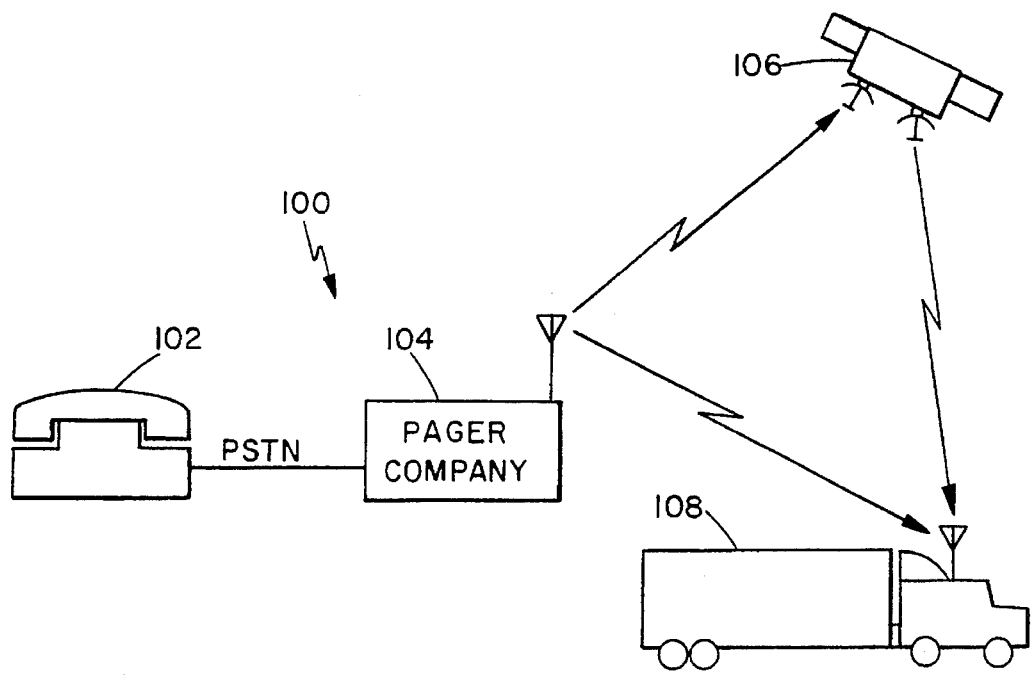
FIG. 1 is a diagrammatical illustration of an exemplary paging system for remotely tripping a switch in a vehicle in accordance with the present invention.

In accordance with the present invention, a system and method are provided for signaling a vehicle or other remote location and causing an action in the vehicle. The system comprises pager unit for receiving an unassisted telephone call made by the vehicle or system owner and a tripping circuit responsive to the pager unit for tripping the switch. For the remainder of this description, the term "vehicle owner" will be used, but it should be understood that this term is used for convenience and that "vehicle owner" as herein defined includes any person or entity having rightful possession, custody, or control of the vehicle (or system), including owners, operators, users, and custodians. An exemplary embodiment of the system of the present invention is shown in FIG. 1 and is designated generally by reference numeral 100.

As embodied and shown in FIG. 1, the system of the present invention includes a telephone 102, a central switching ground-based transmission facility (e.g., a pager company) 104, a satellite 106, and a vehicle 108. The telephone 102 is coupled to the central switching facility 104 over a Public Switched Telephone Network (PSTN). The satellite 106 (or other wireless network, e.g., microwave or radiowave) is used to relay signals from the central switching facility 104 to the vehicle 108. The details of this system are described below.

The telephone 102 is a conventional telephone and thus can be a pay-phone or private phone hard-wired to the PSTN. Alternatively, a cellular or other conventional wireless telephone remotely located from the PSTN can also be used in the system.

Figure 2:
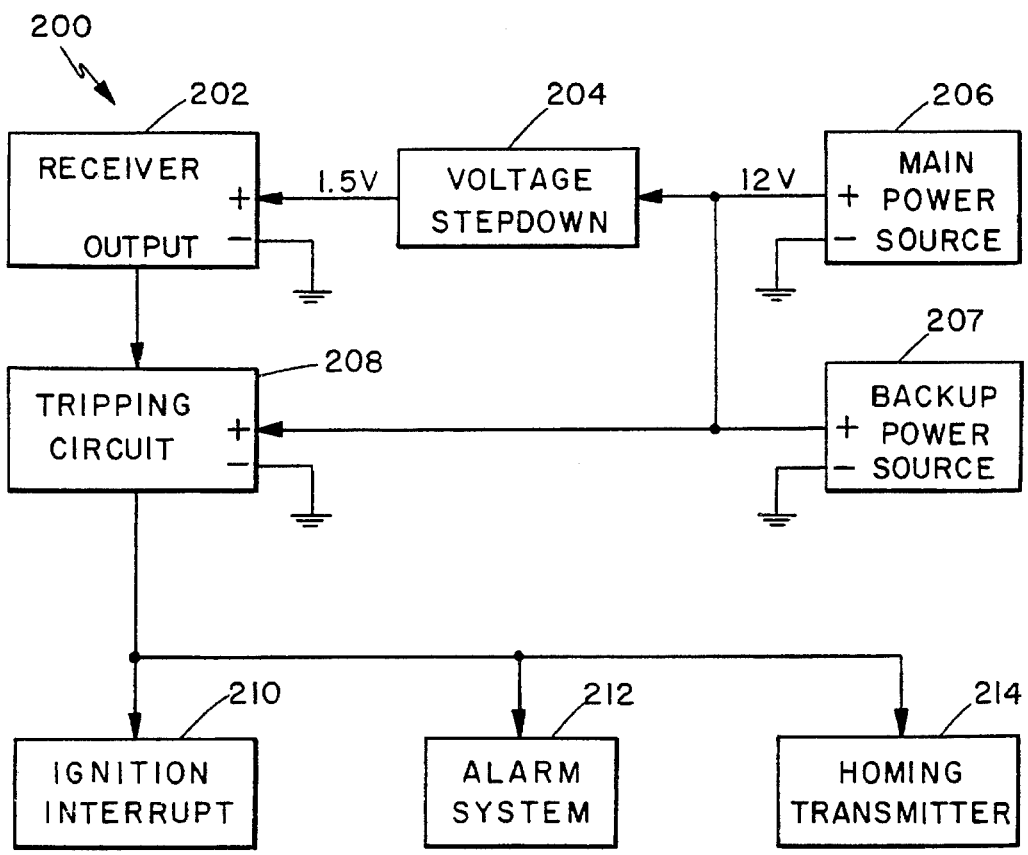
FIG. 2 is a diagrammatical representation of an exemplary receiver and tripping circuit located within a vehicle in accordance with the present invention.

The central switching facility 104 is coupled to the PSTN. In this way, telephone calls can be made by individual callers over the PSTN (or to a Mobile Telephone Switching Office and then over the PSTN) directly to the central switching facility 104. As embodied herein and shown in FIG. 1, the central switching facility is a pager company or other similar signal transmitter through which a person operating the telephone 102 can send a signal to the satellite 106. The satellite is then used to relay the signal to a conventional pager-type receiver located within the vehicle 108. Such a wireless receiver is shown in FIG. 2 and is designated by reference numeral 202. As will be apparent to those skilled in the art, the system of the present invention can also be implemented in other conventional wireless networks, including microwave and radio-wave.

Alternatively, the system can be implemented without the satellite 106, the telephone 102 operator instead sending the signal directly over-the-air to the remote location or vehicle. In this way, the system would operate without the need for a satellite or similar device to relay the signal to the wireless receiver 202.

Referring now to FIG. 2, the vehicle 108 or other remote location includes circuitry 200 for tripping a switch in response to a signal sent by the vehicle or remote location owner. The circuitry 200 includes the wireless receiver 202 as well as a tripping circuit 208. As noted above and as embodied herein, the wireless receiver 202 is preferably a conventional paging device capable of receiving signals transmitted over-the-air, either directly or through a relaying device, such as a satellite. The paging unit is assigned a unique telephone number by which the paging unit can be accessed by a caller. The paging unit 202 is also assigned a predetermined security code, for example, a four-digit number.

The receiver 202 and the tripping circuit 208 are both powered by a DC power source 206 located within the vehicle 108. Conventional vehicle power sources, such as an automobile battery, are generally 12 Volts DC. The receiver 202, however, is a low-voltage device, for example, a 1.5 Volt DC paging unit. Accordingly, a voltage stepdown circuit 204 is used to convert the high voltage generated by the power source 206 to the low voltage for the receiver 202. The tripping circuit 208, on the other hand, can be a 12 Volt DC circuit and thus directly coupled to the power source 206. The receiver 202 can also be coupled to a backup power source 207. The backup power source 207 can be a rechargeable battery, such as a nicad battery, coupled to a device for recharging the battery, for example, an automobile or truck alternator.

The receiver 202 is coupled to the tripping circuit 208. The tripping circuit, in turn, can be coupled to an alarm system 210, an ignition interrupt device 212, a homing transmitter 214, and/or other miscellaneous devices. The alarm system 210 is a conventional alarm system and may be capable of generating various alarm signals.

The homing transmitter 214 is also a conventional device, designed to produce a signal, radio tone, or digital pulse by which the vehicle 108 can be located, for example, through triangulation. As will be apparent to those skilled in the art, the homing transmitter 214 can be implemented in various ways, one of which would be an SOS-type frequency transmitter, commonly used on boats and ships for indicating and locating a man-overboard by producing an "E-PIRB" signal. The homing transmitter 214 could alternatively be a Global Positioning System (GPS) type transmitter, designed to generate a digital location identification for determining the geographic position of the vehicle.

The ignition interrupt 212 is also a conventional device, commonly available from vehicle alarm system manufacturers.

Figure 3A:
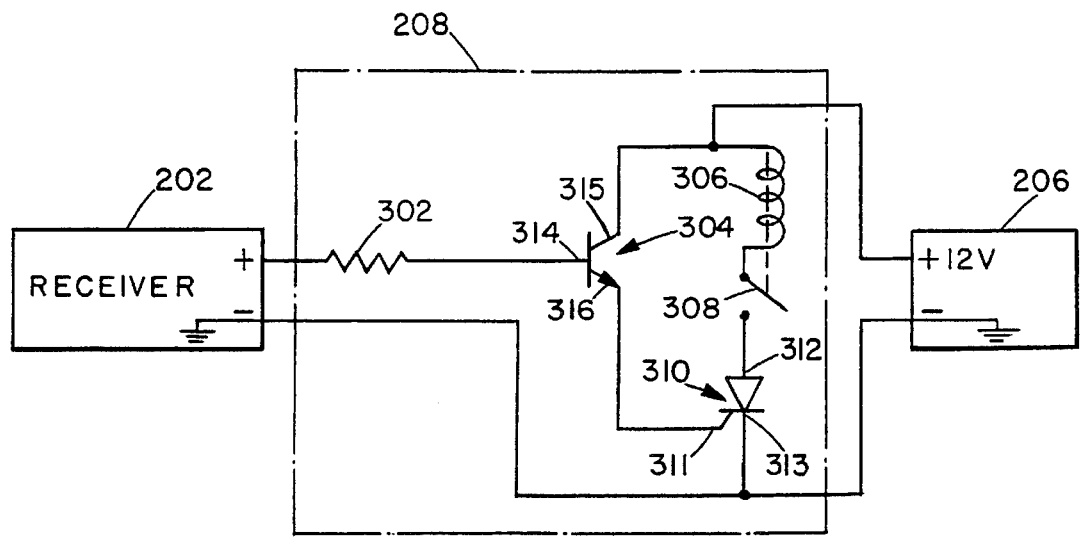
FIG. 3A is a circuit diagram illustrating an exemplary embodiment of the tripping circuit of FIG. 2.
Figure 3B:
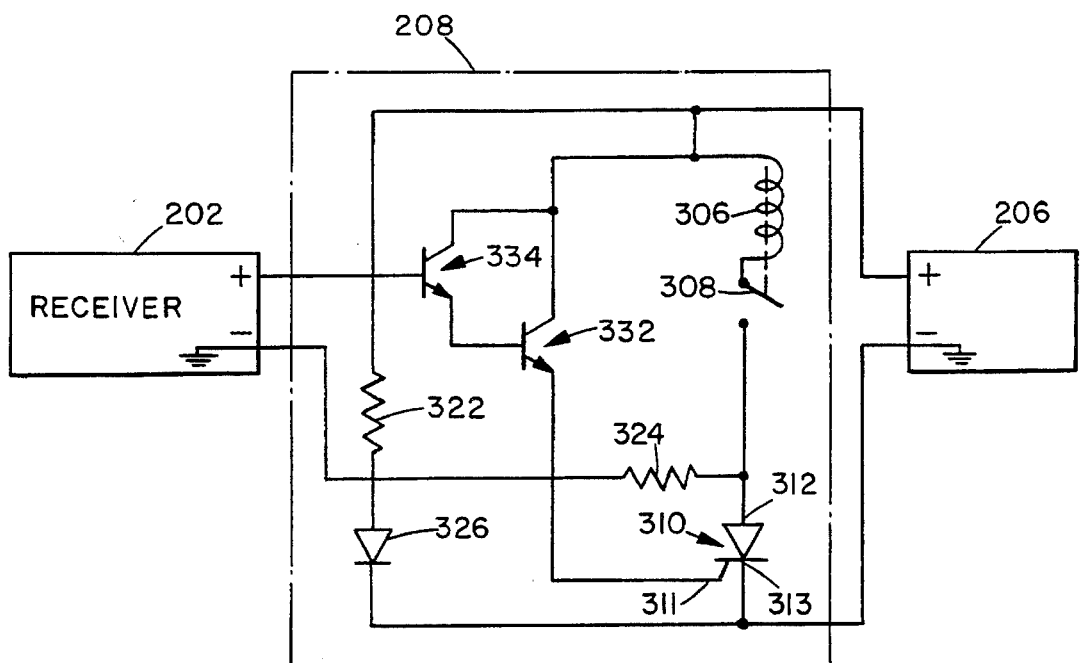
FIG. 3B is a circuit diagram illustrating an alternative exemplary embodiment of the tripping circuit of FIG. 2.

In response to a signal output from the receiver 202, the tripping circuit 208, will operate to trip a switch. As noted above, however, the tripping circuit 208 operates at a high voltage, while the receiver 202 outputs a low voltage signal. Accordingly, in order to trip the high voltage switch and hold the switch in its tripped state, a voltage/current conversion circuit is used. FIGS. 3A and 3B illustrate two examples of such a circuit. As will be apparent to those skilled in the art, other suitable tripping circuits can be used.

The tripping circuits illustrated in FIGS. 3A and 3B are designed such that a low-current, low-voltage input turn-on signal will trigger a normally open 12 Volt (or other voltage) relay (or switch) that will subsequently remain triggered after removal of the turn-on signal. The design objective is to provide this function with a minimum current from the turn-on signal, while providing high current (several amps) switching capability of the relay. Referring now to FIG. 3A, a first embodiment of the tripping circuit includes a limiting resister 302, a transistor 304, a relay 306, a switch 308, and a silicon controlled rectifier (SCR) 310. The input to the circuit 208 is the low-current, low-voltage output from the receiver 202. The voltage from this input signal is, for example, 1.5 Volts D.C. The input signal from the receiver 202 is applied to the base of the transistor 304 through the limiting resister 302, for example, a 3000 Ohm resistor, which is used to limit the current into the base of the transistor 304.

The transistor 304 is a conventional NPN transistor, configured as an emitter follower, with its collector at 12 Volts D.C. as supplied by the power source 206. The transistor 304 has a base 314, a collector 315, and an emitter 316. When a signal is applied to the base 314 of the transistor 304, the transistor operates as a current amplifier. The SCR 310 is a conventional silicon controlled rectifier, functioning as current controlled switch that can operate from a controlling current several orders of magnitude less than the controlled current. The SCR 310 has a gate 311, an anode 312, and a cathode 313.

The emitter 316 of the transistor 304 is connected to the gate 311 of the SCR 310. The current amplification function of the transistor 304 provides a boost to the input signal from the receiver 202, allowing the input signal to turn-on the SCR 310 with a minimum of input current. The cathode 313 of the SCR 310 is connected to ground, and the anode 312 is connected to a coil of the relay 306 through the normally closed contacts of reset switch 308.

In the non-triggered condition, the relay coil 306, the reset switch 308, and the cathode 313 of the SCR 310 are all at 12 Volts potential, with no current flowing in the 12 Volt circuit. When current is pulled through the gate 311 of the SCR 310 by the transistor 304, the SCR turns-on, causing current to flow from its cathode 313 to its anode 312, through the normally closed reset switch 308, thereby triggering the relay coil 306.

The SCR 310 will remain turned-on as long as a minimum of 30 mA is applied through the SCR. As embodied herein, the resistance of the relay 306 is 160 ohms, which supplies 75 mA of current, a level sufficient to maintain the SCR 310 in the on state. When the reset switch 308 is opened from its normally closed state, the current flow through the SCR 310 is interrupted, and the SCR resets to the non-conductive off state.

The components constituting the circuit in FIG. 3A can be implemented, for example, with the following Radio Shack® parts: relay 306 (RS 275-2862), transistor 304 (RS-276-1617), and SCR 310 (RS 276-1067). The Radio Shack® relay specified above has a continuous coil voltage of 13.2 Volts D.C., a coil resistance of 130 Ohms, a pull-in voltage of 9 Volts D.C., a contacting rating of 5.0 Amps at 125 Volts D.C., and a nominal current of 75 mA. The Radio Shack® transistor has a voltage across the collector-emitter of 30 Volts, a collector current of 800 mA, and a power rating of 11.8 Watts. The Radio Shack® SCR has a D.C. gate current of 6 mA and on-state current of 6 Amps, a D.C. holding current of 30 mA, a peak reverse gate voltage of 10 Volts, and an average gate powered dissipation of 0.5 Watts.

Referring now to FIG. 3B, another embodiment of the low-current, low-power tripping circuit 208 is illustrated. This second circuit includes several of the same components comprising the first circuit shown in FIG. 3A, namely, the relay 306, the switch 308, and the SCR 310. In addition to these components, the second circuit includes a first resistor 322, a second resistor 324, a diode 326, a first transistor 332, and a second transistor 334. The circuit shown in FIG. 3B can be implemented using a 400 Ohm resistor for the first resistor 322, a 100 Ohm resistor for the second resistor 324, NPN transistors identical to the transistor 304, and a conventional diode.

In this tripping circuit, the input signal from the receiver 202 is applied to the base of the first transistor 332 and to the cathode 313 of the SCR 310 through the second resistor 324. The second resistor 324 provides a minimal current through the SCR 310 to assist the relay 306 in holding the SCR in the on state until the relay 306 builds up its full current.

The diode 326 is biased forward by the first resistor 322, producing a 0.6 Volt positive reference voltage. The input signal is applied between the base of the first transistor 332 and the reference voltage. Due to the biasing action of the diode 326, the 0.6 Volt input signal applied to the base of the first transistor 332 becomes 1.2 Volts. The first transistor 332 and the second transistor 334 form a power Darlington pair and act as one transistor with a beta gain of 400. The two transistor pair 332, 334 provides a current gain such that the low current input signal from the receiver 202 can turn-on the SCR 310.

When the SCR 310 is set to the on state, the relay 306 starts to build up a current through induction, but the pulse width of the input signal is not long enough to allow the relay to build sufficient current to hold the SCR on. The second resistor 324 provides minimal current through the SCR 310 to assist the relay 306 in holding-on the SCR until the relay builds up its full current. Breaking the relay contacts causes the current through the first resistor 322 to become insufficient to hold the SCR on, and the circuit will thus reset. The pulse width of the input signal must be of sufficient duration to allow the relay 306 to build current to a sufficient level to where the SCR 310 will remain turned-on.

Referring again to FIG. 1, operation of the system 100 will now be described, specifically with respect to a vehicle. It should be understood, however, that the system can be used not only for a vehicle, but for any remote location in which the circuitry 200 can be located and a switch must be remotely tripped.

When the owner of the vehicle 108 equipped with the circuit 200 has knowledge that the vehicle is being illegally and/or wrongfully operated (e.g., a car-jacking), the owner locates a telephone 102 from which to make a call. On the telephone 102, the owner dials the assigned telephone number and security code of the receiver (e.g., a paging unit) 202 located within the vehicle 108. This call is transmitted over the PSTN (if the owner is calling from a telephone wired to the PSTN) to the central switching ground-based transmission facility (or pager company) 104. The calf is then transmitted through the pager company 104 to the satellite 106 or similar device, which relays the call to the receiver 202. In this way, the owner's call is made unassisted, i.e., requires no intervention by a law-enforcement agency or a company that monitors and signals vehicles.

The call could alternatively be directly transmitted from the central switching facility 104 to the receiver 202, bypassing relaying the call through a satellite or similar device. Accordingly, as described previously, the call can be sent through a variety of wireless networks to reach the vehicle 108.

Once the receiver 202 in the vehicle 108 receives the call, it sends an input signal to the tripping circuit 208. The tripping circuit 208 then processes the input signal, amplifying it to a suitable current and causing the SCR 310 to turn-on. After the SCR 310 is turned-on, sufficient current will build up to trigger the relay coil 306. Triggering of the relay 306, in turn, activates the ignition interrupt 212, the alarm system 210, the homing transmitter 214, and/or other optional devices, depending on the systems with which the vehicle is equipped. Once activated, the ignition interrupt shuts-down the vehicle, the alarm system produces whatever aural and/or visual effects it may have, and the homing transmitter emanates a signal by which the vehicle can be tracked or located.

Alternatively, the vehicle 108 may be equipped with a device that terminates the fuel supply to the vehicle's engine. This will cause the vehicle to more gradually shut-down than if the ignition interrupt circuit 214 is provided, preventing the unwanted vehicle operator from losing control of the vehicle before the operation of the engine terminates. The vehicle may also be equipped with a conventional voice or sound circuit for warning the operator that the vehicle is about to shut-down, this circuit also being tripped in response to reception by the receiver 202 of the owner's call. As will be apparent to those skilled in the art, various other devices and methods can be employed to shut-down the vehicle, and a variety of devices can be coupled to the tripping circuit and thereby be activated upon tripping of the switch.

The tripping circuit 208 can be reset, for example, by a manual switch located in the vehicle 108. This switch can be hidden somewhere within the vehicle to prevent the unwanted vehicle operator from discovering it and thereby restarting the vehicle's engine. When manual reset switch is activated by the vehicle owner, the normally closed switch—which opens when the tripping circuit 208 is tripped—will be reclosed, and the tripping circuit 208 will return to its untripped state.

Alternatively, the vehicle owner may remotely call the receiver (or paging unit) 202 in order to reset the tripping circuit 208. The paging unit 202 may have the capacity to recognize a reset code, for example, a four-digit number, similar to the security code. If so equipped, when the owner dials the paging unit's assigned telephone number together with the reset code, the unit will receive this signal and generate a reset signal that resets the tripping circuit.

The system of the present invention can be used by individual vehicle owners to thwart car-jackings. In such cases, the owner witnesses the theft, locates a telephone, and dials the telephone number and security code of the paging unit to disable the vehicle. Operating the vehicle when it is shut-down, the thief will be forced to abandon it. If the owner is able to quickly locate a telephone, say, in a matter of five minutes, and thereby disable the vehicle, the owner can then call the police and tell them the vehicle is no more than a five minute drive from the scene of the car-jacking.

In another application, the system can be used, for example, by rental car companies to prevent delinquent renters from further operation of the rented vehicle. In such cases, when the vehicle is not returned to the company on time, the company can dial the receiver's 202 telephone number and security code and disable the vehicle, preventing unlawful and possibly harmful further use by the renter.

As is apparent from the preceding description, the inventive system and method can be used in many applications on a variety of vehicles and/or remote locations. Automobiles, trucks, boats, motorcycles, and buildings or other structures are examples of the types of vehicles and locations in which the present invention can be employed to prevent and/or stop unwanted and illegal use of the vehicle, or to activate some system in a remote location. Further, the receiver 202 can be implemented using various devices capable of receiving wireless transmissions. And the tripping circuit 208 can be implemented with various circuit components and circuitry, or with computer software embodied in a central or dedicated computer located in the vehicle or remote location.

Therefore, it will be apparent to those skilled in the art that various modifications and variations can be made in the system and method of the present invention without departing from the spirit or scope of the invention. Thus, it is intended that the present invention covers the modifications and variations of this invention, provided they come within the scope of the appended claims and their equivalents.

What is claimed is:

1. A system for remotely stopping a vehicle theft, comprising:

a transmitter for generating a calling code and a predetermined security code;

a central switching unit for receiving said calling code and said predetermined security code and for generating a wireless communication including said calling code and said predetermined security code;

a satellite for receiving and transmitting said wireless communication;

a pager unit, located in a vehicle, for receiving said wireless communication, wherein said pager unit is responsive to said calling code, said pager unit generates a first signal only in response to receiving said predetermined security code;

a tripping circuit, responsive to said first signal and located in said vehicle, for generating a second signal; and a switch, responsive to said second signal and located in said vehicle, for disabling said vehicle;

wherein said pager unit is a receive-only digital receiver that receives only low-power short digital data packets and that cannot receive digital and analog voice transmissions.

2. The system recited in claim 1 wherein the transmitter comprises a telephone for dialing a code, said code generating the wireless communication, said code including a remote location pager number corresponding to the pager unit and a predetermined security code.

3. The system recited in claim 2 wherein the switch includes an ignition interrupt device for stopping operation of an engine in the vehicle.

4. The system recited in claim 1, further comprising a manual switch for setting the tripping circuit.

5. The system recited in claim 2 wherein the pager unit includes means for receiving a tripping circuit setup signal, said tripping circuit setup signal including the pager number and a predetermined setup code, whereby the tripping circuit is set in response to the pager unit receiving said tripping circuit setup signal.

6. The system recited in claim 1, further comprising an indicator, located in the vehicle and responsive to the tripping circuit, for indicating tripping of the switch.

7. The system recited in claim 3, further comprising a warning device, located in the vehicle and responsive to the pager unit, for indicating impending activation of the ignition interrupt device.

8. The system recited in claim 1, further comprising an alarm system, said system being responsive to the tripping circuit.

9. The system recited in claim 1, further comprising a homing circuit, responsive to the tripping circuit, for generating a homing signal.

10. The system of recited in claim 1, further comprising means, responsive to the tripping circuit, for generating a digital location signal corresponding to a location of the vehicle.

11. The system recited in claim 1 wherein said vehicle has a fuel supply, and wherein the action caused by the switch impedes said fuel supply.

12. A method for remotely stopping a vehicle theft, comprising:
    first transmitting a signal be a transmitter, said signal including a calling code and a predetermined security code;
    first receiving said signal by a central switching unit;
    second transmitting said signal by said central switching unit;
    satellite relaying said signal to a pager unit located in a vehicle;
    second receiving said signal by said pager unit if said calling code corresponds to said pager unit;
    generating a tripping pulse by said pager unit only in response to receiving said predetermined security code, said tripping pulse having a low voltage;
    converting said tripping pulse from said low voltage to a higher voltage by a tripping circuit, said tripping circuit being located in said vehicle consisting of a voltage step-up circuit for increasing the voltage of said first signal from said low voltage to said higher voltage; and
    tripping a switch located in said vehicle in response to conversion of said tripping pulse from said low voltage to said higher voltage, thereby disabling said vehicle;
    wherein said pager unit is a receive-only digital receiver that receives only low-power short digital data packets and that cannot receive digital and analog voice transmissions.

13. The method recited in claim 12 wherein the transmitter comprises a telephone.

14. The method recited in claim 12 wherein said vehicle has a vehicle ignition, the method further comprising interrupting said vehicle ignition in response to the tripping step.

15. The method recited in claim 12, further comprising setting the switch, including activating a manual setup switch in the remote location.

16. The method recited in claim 12, further comprising third receiving the pager number and a predetermined setup code, and setting the switch in response to said second receiving step.

17. The method recited in claim 12, further comprising indicating tripping of the switch.

18. The method recited in claim 14, further comprising notifying, in response to the interrupting step, an operator of the vehicle of impending interruption of the vehicle ignition.

19. The method recited in claim 12, further comprising activating an alarm system in response to the tripping step.

20. The method recited in claim 12, further comprising generating a homing signal in response to the first tripping step.

21. The method recited in claim 12, the method further comprising generating a digital location identification signal corresponding to a location of said vehicle.

22. A system for remotely stopping a vehicle theft, consisting essentially of:
    a pager unit, located in a vehicle, for receiving a wireless communication and for generating a first signal in response to receiving said wireless communication, said wireless communication being transmitted by a transmitter to a central switching unit, said central switching unit transmitting said wireless communication to a satellite, said satellite relaying said wireless communication transmitted from said central switching unit to said pager unit, said wireless communication consisting of a digital data packet, and said wireless communication including a calling code corresponding to said pager unit and a predetermined security code, said first signal being generated by said pager unit in response to receiving said predetermined security code;
    a tripping circuit, responsive to said first signal and located in said vehicle, for generating a second signal; and
    a switch, responsive to said second signal, for disabling said vehicle;
    wherein the absence of said predetermined security code in said wireless communication prevents said pager unit from generating said first signal; and
    wherein said pager unit is a receive-only digital receiver that receives only low-power short digital data packets and that cannot receive digital and analog voice transmissions.

23. A system for remotely stopping a vehicle theft, comprising:
    a transmitter for generating a calling code and a predetermined security code;
    a central switching unit for receiving said calling code and said predetermined security code and for generating a wireless communication including said calling code and said predetermined security code;
    a satellite for receiving and transmitting said wireless communication;
    a pager unit, located in a vehicle, for receiving said wireless communication, said pager unit being responsive to said calling code and generating a pager signal in response to receiving said predetermined security code, said pager signal having a low voltage;
    a tripping circuit, responsive to said pager signal and located in said vehicle, for generating a tripping signal, said tripping signal having a higher voltage than said pager signal, said tripping circuit including a voltage step-up circuit for converting the voltage of said pager signal from said low voltage to said higher voltage; and
    an actuator, responsive to said tripping signal, for disabling said vehicle;
    wherein said pager unit is a receive-only digital receiver that receives only low-power short digital data packets and that cannot receive digital and analog voice transmissions; and
    wherein the absence of said predetermined security code in said wireless communication prevents said pager unit from generating said first signal.

24. A system for remotely signaling a door locking system in a vehicle, said door locking system being located in said vehicle, comprising:
    a transmitter for generating a calling code and a predetermined security code;
    a central switching unit for receiving said calling code and said predetermined security code and for generating a wireless communication including said calling code and said predetermined security code;
    a satellite for receiving and transmitting said wireless communication;
    a pager unit, located in said vehicle, for receiving said wireless communication, said pager unit being responsive to said calling code and generating a pager signal in response to receiving said predetermined security code;

a tripping circuit, responsive to said pager signal and located in said vehicle, for generating a tripping signal; and an actuator, responsive to said tripping signal and located in said vehicle, for locking and unlocking said door locking system in said vehicle;

wherein said pager unit is a receive-only digital receiver that receives only low-power digital data packets and that cannot receive digital and analog voice transmission; and wherein the absence of said predetermined security code in said wireless communication prevents said pager unit from generating said first signal.

* * * * *